US012586218B2

(12) United States Patent
    Chen et al.

(10) Patent No.:    US 12,586,218 B2
(45) Date of Patent:        Mar. 24, 2026

(54) MOTION ESTIMATION WITH ANATOMICAL INTEGRITY

(71) Applicant: Shanghai United Imaging Intelligence Co., Ltd., Shanghai (CN)

(72) Inventors: Xiao Chen, Lexington, MA (US); Kun Han, Irvine, CA (US); Zhang Chen, Brookline, MA (US); Yikang Liu, Cambridge, MA (US); Shanhui Sun, Lexington, MA (US); Terrence Chen, Lexington, MA (US)

(73) Assignee: Shanghai United Imaging Intelligence Co., Ltd., Shanghai (CN)

( * ) Notice:    Subject to any disclaimer, the term of this patent is extended or adjusted under 35 U.S.C. 154(b) by 391 days.

(21) Appl. No.: 18/119,435

(22) Filed:    Mar. 9, 2023

(65)            Prior Publication Data
        US 2024/0303832 A1        Sep. 12, 2024

(51) Int. Cl.
    *G06T 7/246*        (2017.01)
    *G06T 7/215*        (2017.01)
(52) U.S. Cl.
    CPC ............. *G06T 7/251* (2017.01); *G06T 7/215* (2017.01); *G06T 2207/20081* (2013.01); *G06T 2207/20084* (2013.01); *G06T 2207/30048* (2013.01)
(58) Field of Classification Search
    CPC .................... G06T 7/251; G06T 7/215; G06T 2207/20081; G06T 2207/20084;
                        (Continued)

(56)            References Cited
            U.S. PATENT DOCUMENTS 6,909,794 B2    6/2005  Caspi
    6,994,673 B2    2/2006  Lysyansky et al.
                (Continued)

FOREIGN PATENT DOCUMENTS

CN        110599499 A    12/2019
    EP        2283444 B1    7/2018
                (Continued)

OTHER PUBLICATIONS

Mansilla, Lucas, Diego H. Milone, and Enzo Ferrante. "Learning deformable registration of medical images with anatomical constraints." Neural Networks 124 (2020): 269-279. (Year: 2020).*

*Primary Examiner* — Henok Shiferaw
*Assistant Examiner* — Dion J Satcher
(74) *Attorney, Agent, or Firm* — Zhong Law, LLC

(57)            ABSTRACT

The motion estimation of an anatomical structure may be performed using a machine-learned (ML) model trained based on medical training images of the anatomical structure and corresponding segmentation masks for the anatomical structure. During the training of the ML model, the model may be used to predict a motion field that may indicate a change between a first training image and a second training image, and to transform the first training image and a corresponding first segmentation mask based on the motion field. The parameters of the ML model may then be adjusted to maintain a correspondence between the transformed first training image and the second training image and between the transformed first segmentation mask or a second segmentation mask associated with the second training image. The correspondence may be assessed based on at least a boundary region shared by the anatomical structure and one or more other anatomical structures.

18 Claims, 5 Drawing Sheets

(58) Field of Classification Search
CPC ............. G06T 2207/30048; G06T 7/11; G06T 2210/41; G06T 7/10; G06T 3/18; G06T 7/73; G06V 10/82; G06V 2201/031; G06V 40/15; G06V 20/695; A61B 5/0044
USPC ................................................. 382/128, 382
See application file for complete search history.

(56)                    References Cited

U.S. PATENT DOCUMENTS

| | | | |
|---|---|---|---|
| 7,490,085 | B2 | 2/2009 | Walker et al. |
| 8,077,944 | B2 | 12/2011 | Schummers |
| 10,600,184 | B2 * | 3/2020 | Golden ................ G06N 3/0985 |
| 2008/0132788 | A1 | 6/2008 | Schreckenberg et al. |
| 2021/0125333 | A1 * | 4/2021 | Oliveira Ferreira .. G06T 11/003 |
| 2021/0216878 | A1 * | 7/2021 | Norman .................... G06T 7/33 |
| 2021/0350549 | A1 * | 11/2021 | Lu ........................... G06V 10/82 |
| 2024/0185428 | A1 * | 6/2024 | Lilaonitkul ............... G06T 7/11 |

FOREIGN PATENT DOCUMENTS

| | | | |
|---|---|---|---|
| WO | 2015168792 | A1 | 11/2015 |
| WO | WO-2022232084 | A1 * | 11/2022 ............. G06T 7/149 |

* cited by examiner

MOTION ESTIMATION WITH ANATOMICAL INTEGRITY

BACKGROUND

Motion estimation plays an important role in determining the vitality and normality of an anatomical structure. For example, cardiac motion estimation can be used to calculate myocardial strains, which in turn may provide insights into the elastic and contractile properties of the myocardium. The time-varying motion of an anatomical structure such as the myocardium may be estimated using deep learning (DL) based techniques, for example, by analyzing images of the anatomical structure recorded during a timer period (e.g., in the format of a video or movie) and tracking changes to the anatomical structure as reflected by the images. Conventional DL based motion estimation techniques rely heavily on image contents (e.g., image contrast and/or intensity) without considering the underlying anatomy of a target anatomical structure. As a consequence, these techniques may produce tracking results that violate the anatomical integrity of the target structure, especially when the target structure and an adjacent structure (e.g., such as the ventricle and the atrium, the myocardium and the papillary muscle, etc.) share a similar image appearance. Accordingly, systems and methods that may improve the accuracy of motion estimation (e.g., with respect to reducing anatomically unrealistic motion estimation) are desirable.

SUMMARY

Described herein are systems, methods and instrumentalities associated with motion estimation. An apparatus configured to perform the motion estimation task may, according to embodiments of the present disclosure, include a processor configured to obtain a first medical image depicting a target anatomical structure (e.g., such as a myocardium), obtain a second medical image depicting the target anatomical structure, and determine, based on the first medical image, the second medical image, and a machine-learned (ML) model, a motion of the target anatomical structure. The ML model may be trained based at least on a first training image depicting multiple anatomical structures including the target anatomical structure, a second training image depicting the multiple anatomical structures, a first segmentation mask associated with the target anatomical structure in the first training image, and a second segmentation mask associated with the target anatomical structure in the second training image. During the training of the ML model, the ML model may be used to predict a motion field that indicates a change between the first training image and the second training image, and to transform the first segmentation mask (e.g., into a transformed or warped first segmentation mask). The parameters of the ML model may then be adjusted at least to maintain a correspondence between the transformed first segmentation mask and the second segmentation mask with respect to a boundary region shared by the target anatomical structure and one or more other anatomical structures (e.g., a left ventricle (LV), a right ventricle (RV), etc.).

In examples, the ML model may be further used during its training to transform the first training image and the parameters of the ML model may be adjusted further to reduce (e.g., minimize) a difference between the transformed first training image and the second training image. In examples, the correspondence between the transformed first segmentation mask and the second segmentation mask as described above may be maintained by determining a difference between the transformed first segmentation mask and the second segmentation mask and adjusting the parameters of the ML model to reduce (e.g., minimize) the difference. In examples, the transformed first segmentation mask may include a first heat map associated with the target anatomical structure, the second segmentation mask may include a second heat map associated with the target anatomical structure, and the boundary region shared by the target anatomical structure and the one or more other anatomical structures may be given a heavier weight in determining the difference between the first heat map and the second heat map than the weight given to a region not shared by the target anatomical structure and the one or more other anatomical structures. For instance, the first heat map may comprise a first set of non-binary values that represents respective probabilities of one or more pixels in the first training image being a part of the target anatomical structure and the second heat map may comprise a second set of non-binary values that represents respective probabilities of one or more pixels in the second training image being a part of the target anatomical structure. In such cases, pixels associated with the boundary region may be assigned higher non-binary values in the first heat map and the second heat map than pixels associated with an unshared region.

In examples, the ML model described herein may be further used during the training of the ML model to determine a first set of feature points (e.g., landmarks) that may correspond to the boundary region in the transformed first segmentation mask (or the transformed first training image) and to determine a second set of feature points (e.g., landmarks) that may correspond to the boundary region in the second segmentation mask (or the second training image). The correspondence between the transformed first segmentation mask (or the transformed first training image) and the second segmentation mask (or the second training image) may then be maintained by at least reducing a difference between the first set of feature points and the second set of feature points.

In examples, the ML model described herein may be implemented via an artificial neural network (ANN) that may include a feature extraction module and a motion field prediction module. The feature extraction module may be configured to extract features from the first medical image and the second medical image, and the motion field prediction module may be configured to determine the motion of the target anatomical structure based on the features extracted by the feature extraction module. The feature extraction module may be trained with the assistance of a segmentation neural network that may be configured to extract features from the first training image or the second training image and to segment the target anatomical structure from the first training image or the second training image based on the extracted features. For example, during the training of the feature extraction module, the respective features extracted by the segmentation neural network and the feature extraction module from the first training image or the second training image may be compared and the parameters of the feature extraction module may be adjusted based on the comparison.

BRIEF DESCRIPTION OF THE DRAWINGS

A more detailed understanding of the examples disclosed herein may be obtained from the following description, given by way of example in conjunction with the accompanying drawing.

DETAILED DESCRIPTION

The present disclosure is illustrated by way of example, and not by way of limitation, in the figures of the accompanying drawings. A detailed description of illustrative embodiments will now be provided with reference to the figures. Although these embodiments may be described with certain technical details, it should be noted that the details are not intended to limit the scope of the disclosure. And while some embodiments may be provided in the context of cardiac magnetic resonance (CMR) imaging, those skilled in the art will understand that the techniques disclosed herein can also be applied to other types of medical images such as, e.g., magnetic resonance images of other anatomical structures, X-ray images, computed tomography (CT) images, photoacoustic tomography (PAT) images, and/or the like.

Figure 1:
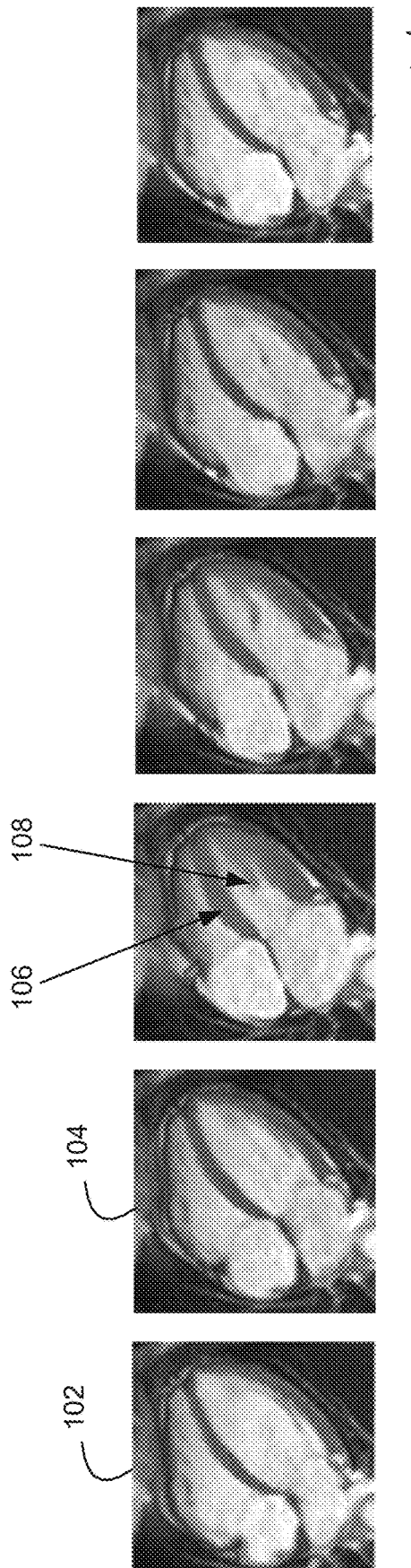
FIG. 1 is a simplified block diagram illustrating an example of cardiac motion estimation in accordance with one or more embodiments of the present disclosure.

FIG. 1 is a block diagram illustrating an example of cardiac motion estimation. The motion estimation may be performed based on a magnetic resonance imaging (MRI) video of a heart such as a cine MRI movie that may include a plurality of magnetic resonance (MR) images of the heart recorded at different points in time (e.g., sequentially along a time axis t). In examples, such a cine movie may depict one or more cycles of cardiac contraction and relaxation. For instance, the image frames in FIG. 1 may show a heart motion starting from relaxation to contraction and back to relaxation. As such, starting from a first image frame 102 of the cine movie, the motion of the heart (e.g., the myocardium) between first image frame 102 and a second image frame 104 may be estimated by comparing the two image frames and identifying changes that may have occurred to the heart between the time image frame 102 was recorded and the time image frame 104 was recorded. Image frame 104 may then be used as a new reference frame, and the estimation process may be repeated for the remaining frames to obtain motion information associated with the heart for a full cardiac cycle.

Various machine-learning (or machine-learned) (ML) techniques may be used to estimate the motion of the heart (e.g., the myocardium) between image frame 102 and image frame 104. For example, an ML model (e.g., an artificial neural network trained to implement the ML model) may be trained to extract features associated with the myocardium from image frame 102 and image frame 104, compare the features extracted from the two image frames, and predict a motion of the myocardium based on the comparison. The motion may be indicated, for example, via a motion field (e.g., a dense motion field) that may include values representing the respective displacements of a set of corresponding pixels or areas of the images from the time image frame 102 was recorded to the time image frame 104 was recorded (or vice versa). Such a technique may rely heavily on the contents of the images (e.g., intensity and/or contrast properties of the images) and therefore may confuse anatomical structures located in the vicinity of each other and having similar image appearances. For example, as shown in FIG. 1, one part of the heart such as the left ventricular muscle 106 may have a similar appearance in the cine images as another part of the heart (e.g., the papillary muscles 108). As such, the content-based motion estimation technique may not be able to clearly distinguish the two parts and, as a consequence, may produce estimation results that are at odds with the underlying anatomical characteristics of the heart.

To improve the accuracy of motion estimation for a target anatomical structure, the content-based estimation techniques described herein may be supplemented by and/or replaced with techniques aimed at preserving the anatomical integrity of the target structure such as the shape, size, and/or orientation of the target structure. In embodiments, this may be accomplished by utilizing segmentation masks associated with the target structure in addition to images of the target structure and/or by training an ML model (e.g., an artificial neural network) based on the images and segmentations tasks to predict the motion of the target structure while ensuring the correspondence of certain feature points shared by the target structure and one or more other anatomical structures before and after the motion.

Figure 2:
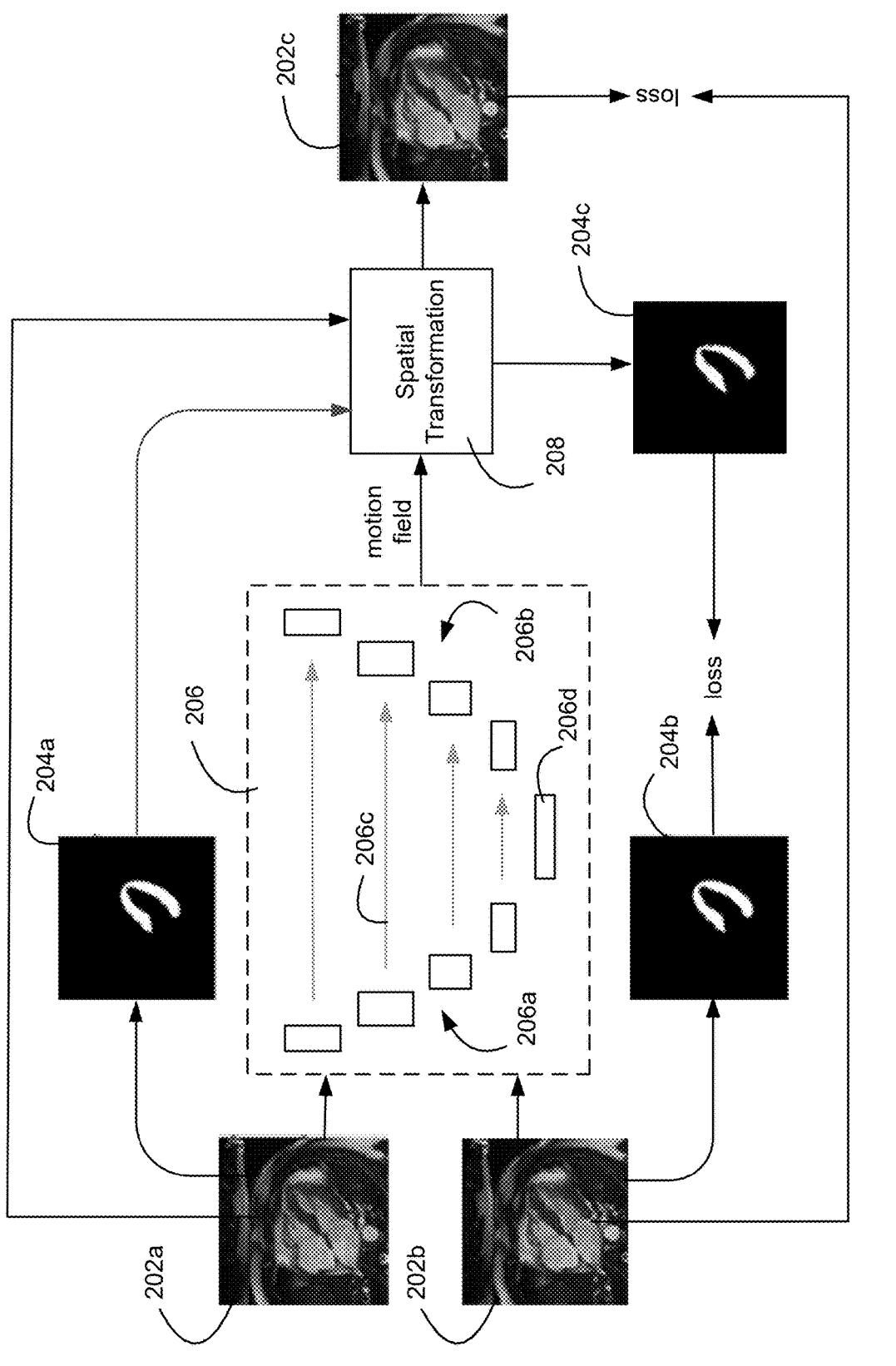
FIG. 2 is a simplified block diagram illustrating an example training an ML model for motion estimation in accordance with one or more embodiments of the present disclosure.

FIG. 2 shows an example of training an ML motion estimation model (e.g., a motion estimation neural network) in accordance with one or more embodiments of the present disclosure. As shown, the motion being estimated may be associated with a target anatomical structure (e.g., such as a myocardium) and the training of the ML model (e.g., the motion estimation neural network) may be conducted based on multiple training images (e.g., a first or moving MR image 202a, a second or target MR image 202b, etc.) and segmentation masks (e.g., a first or moving segmentation mask 204a, a second or target segmentation mask 204b, etc.) associated with the training images. The training images may depict multiple anatomical structures including the target anatomical structure while the segmentation masks may indicate the location and/or contour of at least the target anatomical structure in the corresponding training images. It should be noted that although segmentation masks 204a and 204b are shown in FIG. 2 as binary masks (e.g., with pixel values of ones and zeros indicating whether the corresponding pixels belong or do not belong to the anatomical structure, respectively), these segmentation masks may also be non-binary masks (e.g., heat maps), as will be described in greater detail below. And while only two training images 202a and 202b are shown in FIG. 2, those skilled in the art will understand that the techniques described herein may be used to estimate the motion of the target anatomical structure across any number of medical images (e.g., such as through a cine movie). This may be accomplished, for example, by treating the target image of a first image pair as the moving image of a second image pair and repeating the operations performed on the first image pair for the second image pair.

The motion estimation model or neural network (e.g., 206 of FIG. 2) may include a feature extraction module 206a (e.g., a feature encoder) and a motion field prediction module 206b (e.g., a feature decoder) coupled via one or more skip connections 206*c* and/or a bottleneck 206*d*. The feature extraction module may be trained for extracting features from input images (e.g., training images 202*a* and 202*b*), while the motion field prediction module may be trained for predicting the motion of the target anatomical structure depicted by the images based on the extracted features. The motion field prediction module may, for example, be trained to generate a motion field (which may also be referred to as a flow field) to indicate the motion determined based on the features extracted by the feature extraction module.

In examples, feature extraction module 206*a* may employ a Siamese network architecture (e.g., including twin subnetworks with the same operating parameters or kernel weights) that may be configured to process the input images in tandem. Each subnetwork of feature extraction module 206*a* may include an ANN such as a convolutional neural network (CNN), which in turn may include a plurality of layers such as one or more convolutional layers, one or more pooling layers, and/or one or more fully connected layers. The convolutional layers may include convolution kernels or filters configured to extract features from the input images and the convolution operations may be followed by batch normalization and/or linear or non-linear activation, before the extracted features (e.g., in the form of one or more feature vectors or feature maps) are down-sampled through the pooling layers to reduce the redundancy and/or dimension of the extracted features. As a result of the series of convolution and/or down-sampling operations, respective representations of the features of the input images may be derived, for example, in the form of twin feature maps or twin feature vectors and/or at multiple scales or resolutions. The derived feature maps or vectors of the input images may then be compared or matched, for example, at a patch level and/or via a correlation layer.

In examples, motion field prediction module 206*b* may be implemented as a multi-scale decoder neural network configured to predict or estimate a motion field representative of the changes between the two input images based on the features provided by feature extraction module 206*a*. The prediction or estimation may be made, for example, by identifying matched and mismatched features of the input images in the feature vectors or feature maps provided by feature extraction module 206*a*. In examples, the multi-scale decoder neural network may include a CNN with multiple transposed convolutional layers, un-pooling layers, and/or fully connected layers. Through these neural network layers, the decoder network may perform a series of up-sampling (e.g., such as an output image may have the same size of the input image) and transposed convolution (e.g., deconvolution) operations on the feature maps or feature vectors provided by feature extraction module 206*a* (e.g., at corresponding scales or resolutions) to derive a motion field that may indicate the disparity of the input images. Such a motion field may, for example, include a map or a vector field (e.g., a grid of vectors) comprising values that indicate the displacements of multiple feature points between the input images. As such, the motion field may be used to determine the motion of the target anatomical structure from one of the input images to the other one of the input images.

The training of ML model 206 may be conducted using training images as well as segmentation masks associated with the training images, for example, to learn the anatomy of the target structure and to preserve the anatomical integrity of the motion estimation results. For instance, during the training of ML model 206, the ML model may be used to predict a motion field based on training images 202*a* and 202*b* that may indicate a change between the two training images. The motion field may be used to transform (e.g., via a spatial transformation network 208) one of the training images such as training image 202*a* and a segmentation mask (e.g., 204*a*) associated with the training image to obtain a transformed (e.g., warped) training image 202*c* and a transformed (e.g., warped) segmentation mask 204*c*, respectively. The transformed training image and segmentation mask may then be compared, respectively, to the other one of the training images (e.g., 202*b*) and the other one of the training segmentation masks (e.g., 204*b*) to evaluate the accuracy of the predicted motion field based on a first loss or difference between transformed image 202*c* and training image 202*b* (e.g., which may serve as a ground truth for the prediction) and a second loss or difference between transformed segmentation mask 204*c* and training segmentation mask 204*b* (e.g., which may serve as an additional ground truth for the prediction). While the first loss may reflect a difference associated with the intrinsic image properties (e.g., signal intensity and/or contrast) of the transformed image and the desired image, the second loss may indicate a difference in the anatomy (e.g., shape and/or boundaries) of the target anatomical structure as represented by the transformed segmentation mask and the desired segmentation mask. This way, both local characteristics of the images (e.g., as reflected through image intensity and/or contrast) and global characteristics of the target anatomical structure (e.g., as indicated by the segmentation masks or labels) may be considered during the training of the ML model to improve its accuracy and adaptability. For example, the parameters of the ML model may be adjusted (e.g., learned) with an objective to maintain a correspondence between transformed training image 202*c* and input training image 202*b* and between transformed segmentation mask 204*c* and input segmentation mask 204*b*. As will be described in greater detail below, the correspondences may be determined with respect to at least a boundary region (e.g., feature points) shared by the target anatomical structure and one or more other anatomical structures in the images and/or segmentation masks, and the parameters of the ML model may be adjusted by a backpropagating a gradient descent of the first and/or second loss through the neural network(s) used to the implemented the ML model.

In examples, the spatial transformation network used to transform training image 202*a* and/or segmentation mask 204*a* may include an input layer, one or more hidden layers (e.g., convolutional layers), and/or an output layer. In operation, the spatial transformation network may take image 202*a* or segmentation mask 204*a* as well as the motion field predicted by ML model 206 as inputs, obtain a plurality of transformation parameters (e.g., a transformation matrix) based on the motion field, and use the transformation parameters to create a sampling grid that may include a set of points where the input image or segmentation mask may be sampled to produce a transformed or warped image or segmentation mask. Input image 202*a* and segmentation mask 204*a* may then be provided to a sampler of the spatial transformation network to produce transformed image 202*c* and transformed segmentation mask 204*c*, respectively.

In examples, the segmentation masks used during the training of the ML model may be obtained using a segmentation neural network (e.g., a ML segmentation model) trained for extracting features from an input image of the target anatomical structure (e.g., training image 202*a* or 202*b*) and producing a segmentation mask for the target anatomical structure based on the extracted features. Such a segmentation network may utilize one or more of the neural network architectures described herein, and may be trained separately from (e.g., pre-trained before) the motion estimation neural network described herein or together with the motion estimation neural network described herein (e.g., in an end-to-end manner). In examples, the motion estimation neural network described herein may employ an encoder-decoder architecture (e.g., with the encoder configured to perform the functionalities of feature extraction module 206a and the decoder configured to perform the functionalities of motion field prediction module 206b), and the feature encoding and/or decoding operations of the motion estimation neural network (e.g., at multiple scales or resolutions) may be forced to resemble (e.g., align with) the encoding and/or decoding operations of the segmentation neural network such that the anatomy of the target anatomical structure learned by the segmentation neural network may be factored into the operation of the motion estimation neural network. In this manner, both the encoder and the decoder may generate prediction results that conform with the anatomy of the target anatomical structure.

In preserving the anatomical integrity of the target structure during the motion estimation, attention may be given to a boundary region (e.g., feature points in the boundary region) shared by the target structure and one or more other anatomical structures that may be located in the vicinity of (e.g., adjacent to) the target structure. This may be because an anatomically accurate motion estimation should not change the correspondence of such a boundary region between a transformed image or segmentation mask (e.g., image 202c or mask 204c) and a target image or segmentation mask (e.g., image 202b and mask 204b). Therefore, by focusing on (e.g., giving more weight to) enforcing the correspondence of such a boundary region in the images or segmentation masks described above, the training of ML model 206 may achieve a better result with respect to preserving the anatomy of the target anatomical structure.

Figure 3:
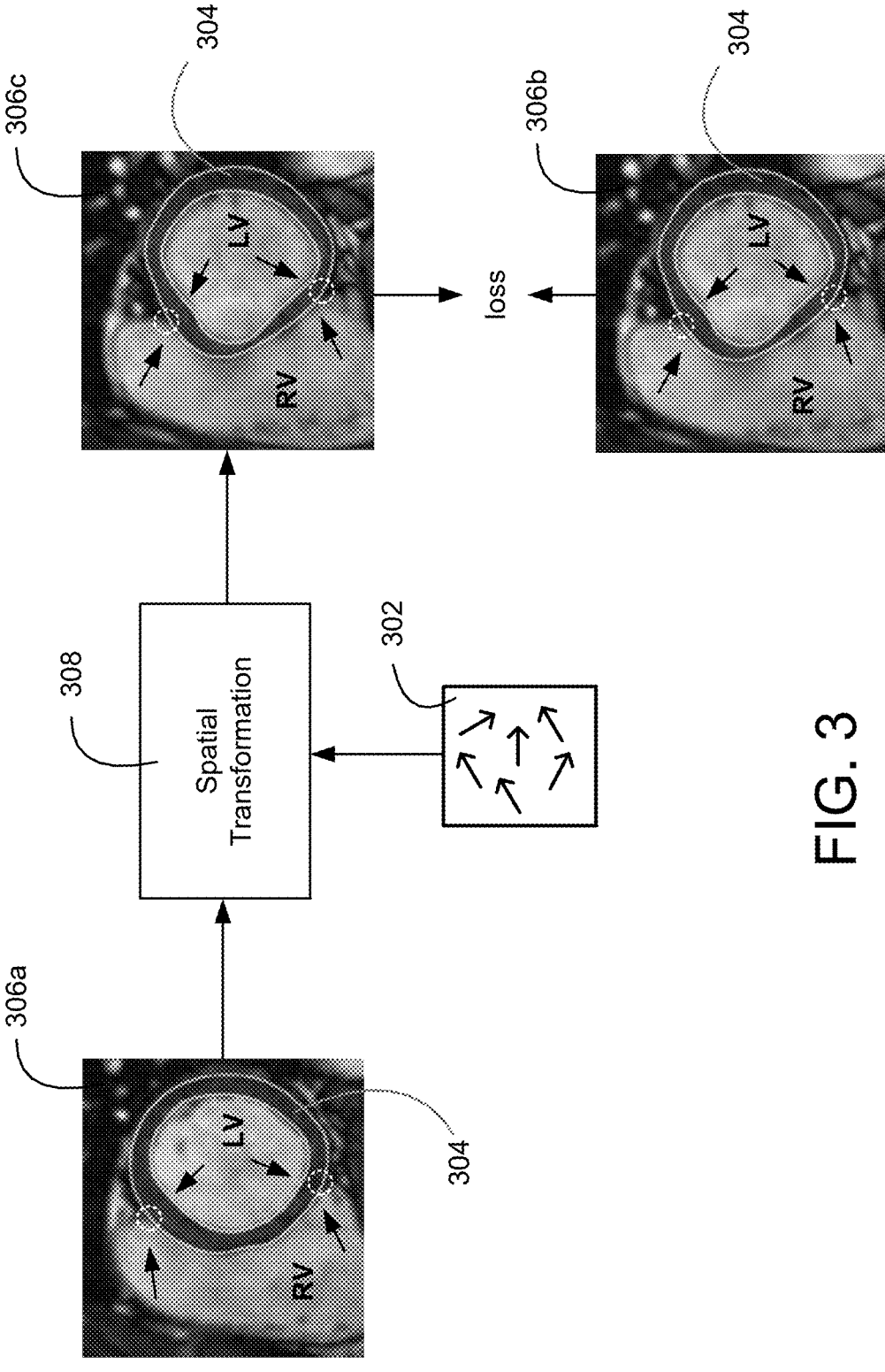
FIG. 3 is a simplified block diagram illustrating an example of training an ML model to maintain the correspondence of a boundary region shared by multiple anatomical structures in accordance with one or more embodiments of the present disclosure.

FIG. 3 illustrates an example of training an ML model (e.g., ML model 206 of FIG. 2) to maintain the correspondence of a boundary region shared by multiple anatomical structures in two segmentation masks. In the example, the ML model may, during its training, predict a motion field 302 based on a pair of input images of an anatomical structure such as myocardium 304, where the motion field may indicate a motion of the myocardium between the two input images. The training of the ML model further utilize two segmentation masks for the myocardium that may correspond to the input images. As described herein, these segmentation masks may delineate (e.g., mark the outline of) the myocardium in the input images, e.g., as illustrated by 306a and 306b in FIG. 3. The myocardium may include a region (e.g., pointed to by the arrows in FIG. 3) that may be shared by the myocardium and one or more other anatomical structures of the heart such as the right ventricle (RV) and/or the left ventricle (LV). Such a region may include a plurality of feature points (e.g., landmarks such as the intersection points of the LV and the RV indicated by the dotted circles in FIG. 3) that may be identified during the training of the ML model and used to ensure that the motion field predicted by the ML model preserves the correspondence of these feature points before and after the predicted motion. For example, during the training of the ML model, the motion field predicted by the ML model may be used to transform (e.g., at 308) one of the training segmentation masks (e.g., such as 306a) to derive a transformed or warped segmentation mask (e.g., such as 306c). Feature points (e.g., landmarks such as the intersection points of the LV and the RV) associated with the region that may be shared by the myocardium and the RV/LV may be identified in the transformed segmentation mask and the other one of the training segmentation masks (e.g., 306b), and a comparison may be made between at least the two sets of feature points to determine a loss that may be caused by the predicted motion field. The loss may then be used (e.g., in addition to an image intensity-based loss) to adjust the parameters of the ML model so as to reduce or minimize the difference between the two sets of feature points.

In examples, the segmentation masks used in the training of the ML model may be non-binary segmentation masks such as heat maps comprising numerical pixel values that may indicate the probabilities of the corresponding pixels being a part of the target anatomical structure. In these examples, heat map pixels that may be associated with the feature points (e.g., landmarks) in the boundary region may be assigned higher values (e.g., than heat map pixels associated with a region not shared by the target anatomical structure and the one or more other anatomical structures) such that the shared feature points may be given a heavier weight (e.g., than non-shared feature points) in determining the loss between transformed segmentation mask 306c and target segmentation mask 306b. In this manner, the boundary region shared by the multiple anatomical structures (e.g., the myocardium, RV and LV) may be used to derive motion estimation results that are consistent with the anatomical characteristics of the target anatomical structure.

In examples, a landmark estimation neural network may be trained (e.g., as a separate neural network or a branch of the motion estimation neural network described herein) to directly predict the feature points that may be used for motion estimation (e.g., as opposed to determining the feature points based on segmentation masks associated with multiple anatomical structures). For example, such a landmark estimation neural network may take images and/or intermediate features estimated by the motion estimation neural network as inputs and output a heatmap that may indicate the locations of the feature points. The landmark estimation neural network may be trained separately from the motion estimation neural network (e.g., pre-trained before the motion estimation neural network) or jointly with the motion estimation neural network (e.g., in an end-to-end manner).

Compared to training techniques that may focus only on the target anatomical structure (e.g., myocardium 304), the technique described herein may (e.g., additionally) utilize the correspondence between multiple anatomical structures (e.g., between the myocardium and the RV, between the myocardium and the LV, etc., even if only the myocardium is of interest) to ensure that the predicted motion does not violate the anatomical integrity of the heart and that the correspondence between the multiple anatomical structures is preserved. These assurances may be desirable for motion tracking and estimation in medical settings since a downstream medical task such as one involving strain calculation may rely on the correspondence of multiple anatomical structures. The multi-structure correspondence may also provide additional feature points that may be used to supervise the training of the ML model, alleviating the shortage of ground truth data for that purpose.

Figure 4:
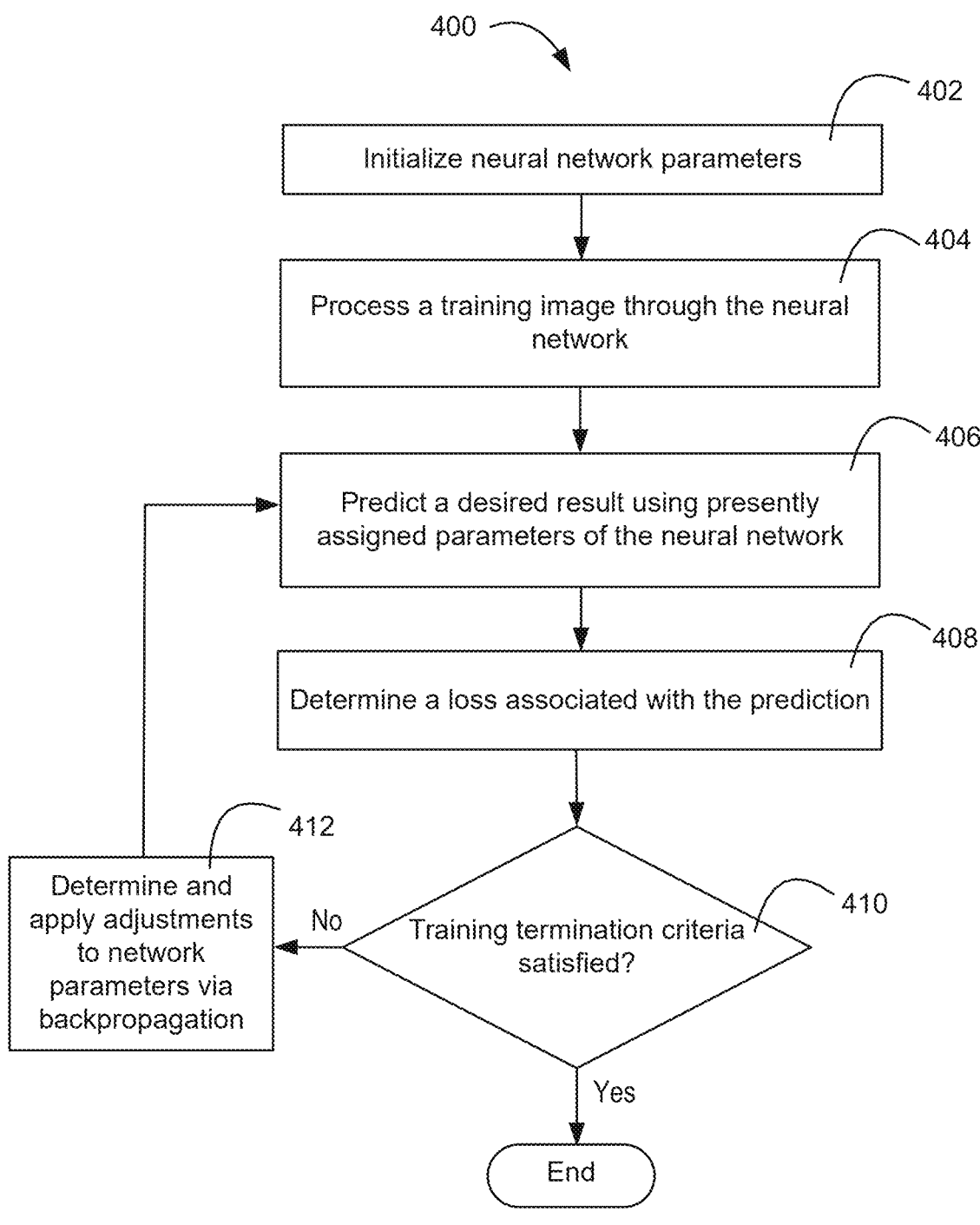
FIG. 4 is a flow diagram illustrating an example process for training an artificial neural network to perform the motion estimation tasks described in one or more embodiments of the present disclosure.

FIG. 4 illustrates an example process 400 for training an artificial neural network (e.g., the motion estimation neural network described herein) to perform one or more of the tasks described herein. As shown, the training process may include initializing parameters of the neural network (e.g., weights associated with various layers of the neural network) at 402, for example, based on samples from one or more probability distributions or parameter values of another neural network having a similar architecture. The training process may further include processing an input training image (e.g., a CMR image depicting a myocardium) or an input segmentation mask (e.g., for the myocardium) at 404 using presently assigned parameters of the neural network and making a prediction for a desired result (e.g., motion field, a set of feature points, etc.) at 406. The predicted result may be compared to a corresponding ground truth at 408 to determine a loss associated with the prediction. Such a loss may be determined, for example, based on mean squared errors between the predicted result and the ground truth, or as a DICE score for the prediction. At 410, the loss may be evaluated to determine whether one or more training termination criteria are satisfied. For example, the training termination criteria may be determined to be satisfied if the loss is below a threshold value or if the change in the loss between two training iterations falls below a threshold value. If the determination at 410 is that the termination criteria are satisfied, the training may end; otherwise, the presently assigned network parameters may be adjusted at 412, for example, by backpropagating a gradient descent of the loss through the network before the training returns to 406.

For simplicity of explanation, the training operations are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 5:
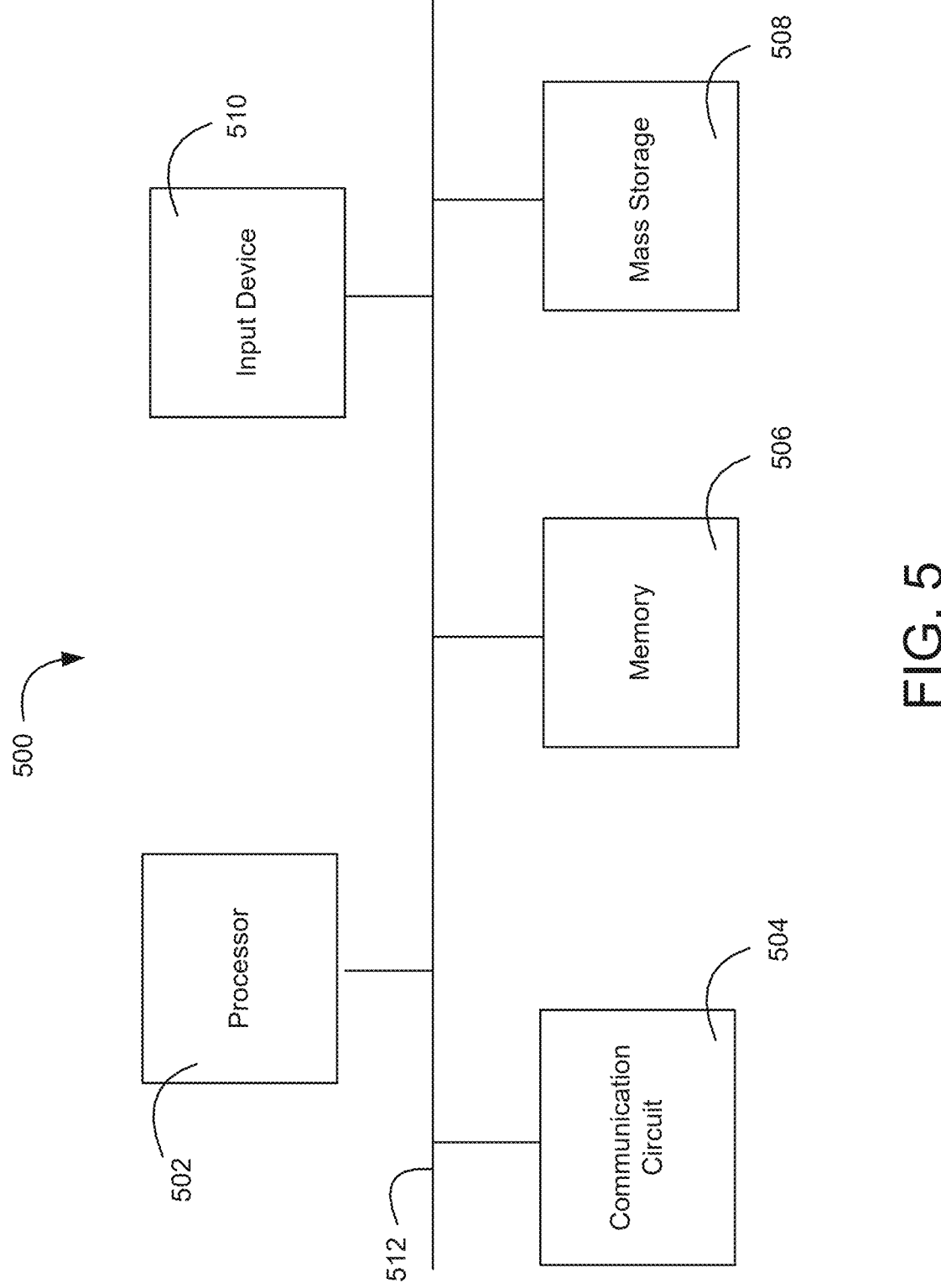
FIG. 5 is a simplified block diagram illustrating example components of an apparatus that may be configured to perform the motion estimation tasks described in one or more embodiments of the present disclosure.

The systems, methods, and/or instrumentalities described herein may be implemented using one or more processors, one or more storage devices, and/or other suitable accessory devices such as display devices, communication devices, input/output devices, etc. FIG. 5 is a block diagram illustrating an example apparatus 500 that may be configured to perform the tasks described herein. As shown, apparatus 500 may include a processor (e.g., one or more processors) 502, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 500 may further include a communication circuit 504, a memory 506, a mass storage device 508, an input device 510, and/or a communication link 512 (e.g., a communication bus) over which the one or more components shown in the figure may exchange information.

Communication circuit 504 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 506 may include a storage medium (e.g., a non-transitory storage medium) configured to store machine-readable instructions that, when executed, cause processor 502 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 508 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 502. Input device 510 may include a keyboard, a mouse, a voice-controlled input device, a touch sensitive input device (e.g., a touch screen), and/or the like for receiving user inputs to apparatus 500.

It should be noted that apparatus 500 may operate as a standalone device or may be connected (e.g., networked, or clustered) with other computation devices to perform the functions described herein. And even though only one instance of each component is shown in FIG. 5, a skilled person in the art will understand that apparatus 500 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
a processor configured to:
obtain a first medical image depicting a target anatomical structure;
obtain a second medical image depicting the target anatomical structure; and
determine, based on the first medical image, the second medical image, and a machine-learned (ML) model, a motion of the target anatomical structure, wherein:
the ML model is trained based at least on a first training image depicting multiple anatomical structures including the target anatomical structure, a second training image depicting the multiple anatomical structures, a first segmentation mask associated with the target anatomical structure in the first training image, and a second segmentation mask associated with the target anatomical structure in the second training image; and
during the training of the ML model:
the ML model is used to predict a motion field that indicates a change between the first training image and the second training image;
the motion field is used to transform the first segmentation mask; and parameters of the ML model are adjusted at least to reduce a difference between the transformed first segmentation mask and the second segmentation mask, wherein, in determining the difference between the transformed first segmentation mask and the second segmentation mask, the processor is configured to give a boundary region shared by the target anatomical structure and one or more other anatomical structures a heavier weight than a region not shared by the target anatomical structure and the one or more other anatomical structures.

2. The apparatus of claim 1, wherein, during the training of the ML model, the ML model is further used to transform the first training image and the parameters of the ML model are adjusted further to reduce a difference between the transformed first training image and the second training image.

3. The apparatus of claim 1, wherein the transformed first segmentation mask includes a first heat map associated with the target anatomical structure, and the second segmentation mask includes a second heat map associated with the target anatomical structure.

4. The apparatus of claim 3, wherein the first heat map comprises a first set of non-binary values that represents respective probabilities of one or more pixels in the first training image being a part of the target anatomical structure and wherein the second heat map comprises a second set of non-binary values that represents respective probabilities of one or more pixels in the second training image being a part of the target anatomical structure.

5. The apparatus of claim 3, wherein pixels associated with the boundary region are assigned higher non-binary values in the first heat map and the second heat map than pixels associated with the region not shared by the target anatomical structure and the one or more other anatomical structures.

6. The apparatus of claim 1, wherein, during the training of the ML model, the ML model is further used to determine a first set of feature points that corresponds to the boundary region in the transformed first segmentation mask and determine a second set of feature points that corresponds to the boundary region in the second segmentation mask, and wherein the correspondence between the transformed first segmentation mask and the second segmentation mask is maintained at least by reducing a difference between the first set of feature points and the second set of feature points.

7. The apparatus of claim 1, wherein the ML model is implemented via an artificial neural network (ANN) that includes a feature extraction module and a motion field prediction module, the feature extraction module is configured to extract features from the first medical image and the second medical image, and the motion field prediction module is configured to determine the motion of the target anatomical structure based on the features extracted by the feature extraction module.

8. The apparatus of claim 7, wherein the feature extraction module is trained with the assistance of a segmentation neural network configured to extract features from the first training image or the second training image and segment the target anatomical structure from the first training image or the second training image based on the extracted features, and wherein, during the training of the feature extraction module, parameters of the feature extraction module are adjusted by comparing the respective features extracted by the segmentation neural network and the feature extraction module from the first training image or the second training image.

9. The apparatus of claim 1, wherein the target anatomical structure includes a myocardium and the one or more other anatomical structures include at least one of a left ventricle or a right ventricle.

10. A method for motion estimation, the method comprising:
obtaining a first medical image depicting a target anatomical structure;
obtaining a second medical image depicting the target anatomical structure; and
determining, based on the first medical image, the second medical image, and a machine-learned (ML) model, a motion of the target anatomical structure, wherein:
the ML model is trained based at least on a first training image depicting multiple anatomical structures including the target anatomical structure, a second training image depicting the multiple anatomical structures, a first segmentation mask associated with the target anatomical structure in the first training image, and a second segmentation mask associated with the target anatomical structure in the second training image; and
during the training of the ML model:
the ML model is used to predict a motion field that indicates a change between the first training image and the second training image;
the motion field is used to transform the first segmentation mask; and
parameters of the ML model are adjusted at least to reduce a difference between the transformed first segmentation mask and the second segmentation mask, wherein, in determining the difference between the transformed first segmentation mask and the second segmentation mask, a boundary region shared by the target anatomical structure and one or more other anatomical structures is given a heavier weight than a region not shared by the target anatomical structure and the one or more other anatomical structures.

11. The method of claim 10, wherein, during the training of the ML model, the ML model is further used to transform the first training image and the parameters of the ML model are adjusted further to reduce a difference between the transformed first training image and the second training image.

12. The method of claim 10, wherein the transformed first segmentation mask includes a first heat map associated with the target anatomical structure, and the second segmentation mask includes a second heat map associated with the target anatomical structure.

13. The method of claim 12, wherein the first heat map comprises a first set of non-binary values that represents respective probabilities of one or more pixels in the first training image being a part of the target anatomical structure and wherein the second heat map comprises a second set of non-binary values that represents respective probabilities of one or more pixels in the second training image being a part of the target anatomical structure.

14. The method of claim 12, wherein pixels associated with the boundary region are assigned higher non-binary values in the first heat map and the second heat map than pixels associated with the region not shared by the target anatomical structure and the one or more other anatomical structures.

15. The method of claim 10, wherein, during the training of the ML model, the ML model is further used to determine a first set of feature points that corresponds to the boundary region in the transformed first segmentation mask and determine a second set of feature points that corresponds to the boundary region in the second segmentation mask, and wherein the correspondence between the transformed first segmentation mask and the second segmentation mask is maintained at least by reducing a difference between the first set of feature points and the second set of feature points.

16. The method of claim 10, wherein the ML model is implemented via an artificial neural network (ANN) that includes a feature extraction module and a motion field prediction module, the feature extraction module is configured to extract features from the first medical image and the second medical image, and the motion field prediction module is configured to determine the motion of the target anatomical structure based on the features extracted by the feature extraction module.

17. The method of claim 16, wherein the feature extraction module is trained with the assistance of a segmentation neural network configured to extract features from the first training image or the second training image and segment the target anatomical structure from the first training image or the second training image based on the extracted features, and wherein, during the training of the feature extraction module, parameters of the feature extraction module are adjusted by comparing the respective features extracted by the segmentation neural network and the feature extraction module from the first training image or the second training image.

18. A method for training a machine-learned (ML) model for motion estimation, the method comprising:

obtaining a first training image depicting multiple anatomical structures including a target anatomical structure;

obtaining a second training image depicting the multiple anatomical structures;

obtaining a first segmentation mask associated with the target anatomical structure in the first training image;

obtaining a second segmentation mask associated with the target anatomical structure in the second training image;

predicting, based on the ML model, a motion field that indicates a change between the first training image and the second training image;

transforming the first segmentation mask based on the motion field; and adjusting parameters of the ML model at least to reduce a difference between the transformed first segmentation mask and the second segmentation mask, wherein, in determining the difference between the transformed first segmentation mask and the second segmentation mask, a boundary region shared by the target anatomical structure and one or more other anatomical structures is given a heavier weight than a region not shared by the target anatomical structure and the one or more other anatomical structures.

* * * * *